US011530736B2

(12) United States Patent
Kish et al.

(10) Patent No.: US 11,530,736 B2
(45) Date of Patent: Dec. 20, 2022

(54) SUPPORT MECHANISM FOR A TRACK SYSTEM

(71) Applicant: Ford Global Technologies, LLC, Dearborn, MI (US)

(72) Inventors: Joseph Michael Kish, Canton, MI (US); Joshua Gauthier, South Lyon, MI (US); Matthew Schwope, Belleville, MI (US); Robert Clayton Caldwell, Royal Oak, MI (US); Johnathan Andrew Line, Northville, MI (US); Cung K. Chieu, Tecumseh (CA); Changwei Xie, Novi, MI (US); Macit Aktas, Windsor (CA); Glenn Scott, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 703 days.

(21) Appl. No.: 16/452,985

(22) Filed: Jun. 26, 2019

(65) Prior Publication Data

US 2020/0408280 A1 Dec. 31, 2020

(51) Int. Cl.
*F16H 1/16* (2006.01)
*B60N 2/90* (2018.01)
(Continued)

(52) U.S. Cl.
CPC .............. *F16H 1/16* (2013.01); *B60N 2/2231* (2013.01); *B60N 2/929* (2018.02); *F16H 2001/326* (2013.01)

(58) Field of Classification Search
CPC ................. F16H 1/16; F16H 2001/326; F16H 2025/2084; F16H 2025/209; F16H 25/2409; B60N 2/929; B60N 2/2231; B60N 2/186; B60N 2/2236; B60N 2/233; B60N 2/067; B60N 2/0232; B60N 2/08; B60N 2/0862;
(Continued)

(56) References Cited

U.S. PATENT DOCUMENTS 2,421,181 A * 5/1947 Batchelder ............ F16B 35/042
81/436
2,433,899 A * 1/1948 Granger .................... B25B 1/20
269/251
(Continued)

FOREIGN PATENT DOCUMENTS

CA 2505207 A1 * 11/2005 ........... B60N 2/0232
DE 19944690 A1 * 4/2000 ........... B60N 2/0232
(Continued)

*Primary Examiner* — Jake Cook
*Assistant Examiner* — T. Scott Fix
(74) *Attorney, Agent, or Firm* — Vichit Chea; Price Heneveld LLP

(57) ABSTRACT

A track system includes a track member with an elongate shaft mounted thereto. At least one support mechanism is mounted to the track member. The at least one support mechanism includes a housing. An engagement feature includes first and second engagement members spaced-apart from one another to define a receiving area therebetween. The first and second engagement members are operable between deployed and retracted positions relative to the housing. The elongate shaft is received in the receiving area when the first and second engagement members are in the deployed position.

15 Claims, 18 Drawing Sheets

(51) Int. Cl.
    *B60N 2/22* (2006.01)
    *F16H 1/32* (2006.01)
(58) Field of Classification Search
    CPC .... B60N 2/0868; B60N 2/0881; B60N 2/073;
        B60N 2/1675; B60N 2002/024; B60N
        2002/0236; F16L 3/1207; F16L 3/1091;
        F16L 3/02; F16L 3/006; F16B 7/04;
        F16B 1/00; F16B 35/042; F16B 35/041;
        Y10S 411/942; B23Q 3/064; B23Q
        3/106; B23Q 3/082; B23Q 3/104; B25B
        1/2405; B25B 1/02; B25B 5/166; B25B
        5/14; B25B 5/109; B25B 5/006; B25B
        5/003; B25B 5/145; B25B 5/02; B25B
        5/067
    USPC .......................................... 74/84 R; 248/429
    See application file for complete search history.

(56) References Cited

U.S. PATENT DOCUMENTS

| | | | |
|---|---|---|---|
| 3,951,004 A | 4/1976 | Heesch | |
| 4,645,159 A | 2/1987 | Terada et al. | |
| 4,802,374 A | 2/1989 | Hamelin et al. | |
| 5,222,402 A | 6/1993 | White et al. | |
| 5,481,949 A * | 1/1996 | Yen | B25B 23/0035 81/177.85 |
| 5,516,071 A | 5/1996 | Miyauchi | |
| 5,709,363 A | 1/1998 | Matsuhashi | |
| 5,816,110 A * | 10/1998 | Schuler | B60N 2/0715 248/429 |
| 5,909,866 A | 6/1999 | Vaidyanathan et al. | |
| 6,220,642 B1 * | 4/2001 | Ito | B60N 2/0232 296/65.14 |
| 6,260,922 B1 | 7/2001 | Frohnhaus et al. | |
| 2004/0206195 A1 | 10/2004 | Landskron et al. | |
| 2009/0243327 A1 * | 10/2009 | Koga | B60N 2/34 296/65.15 |
| 2011/0095160 A1 * | 4/2011 | Kimura | B60N 2/067 248/429 |

FOREIGN PATENT DOCUMENTS

| | | | | |
|---|---|---|---|---|
| EP | 0327705 A1 * | 8/1989 | | B23Q 5/404 |
| GB | 1178752 A * | 1/1970 | | B23Q 5/40 |
| GB | 2149695 A * | 6/1985 | | B23Q 5/40 |

* cited by examiner

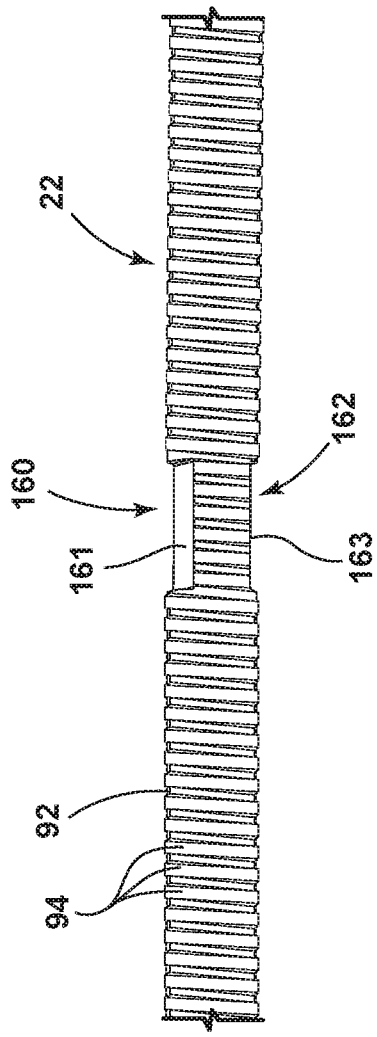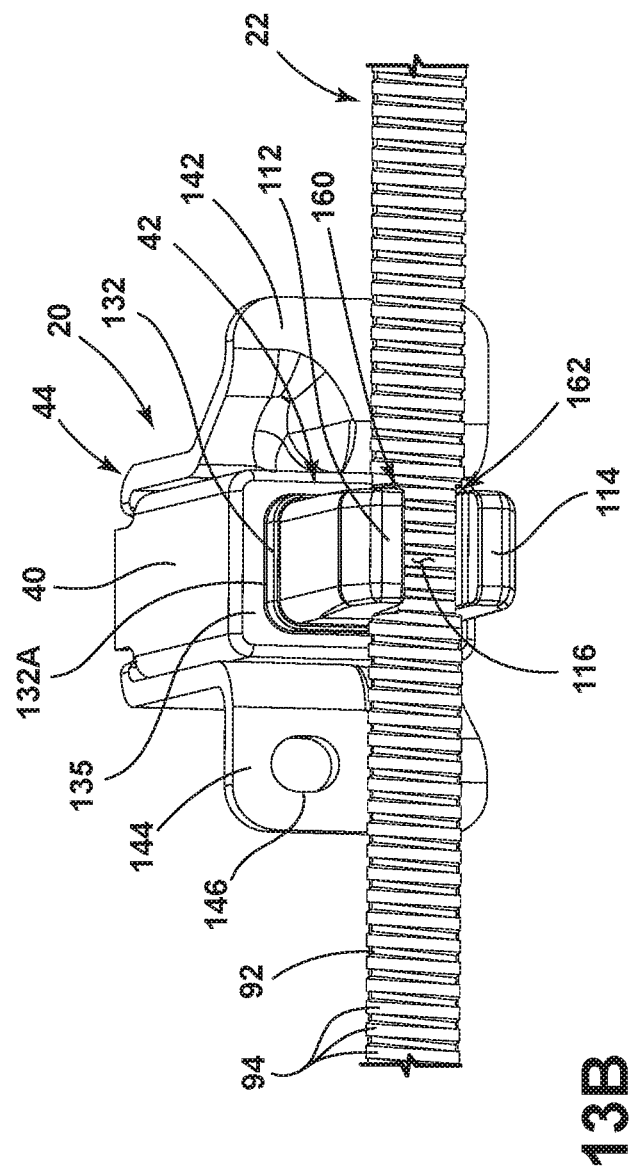

SUPPORT MECHANISM FOR A TRACK SYSTEM

FIELD OF THE INVENTION

The present invention generally relates to a track system for supporting vehicle components in a position adjustable manner, and, more particularly, to support mechanisms for track systems having extended rails for accommodating longer travel distances within a vehicle interior.

BACKGROUND OF THE INVENTION

Support mechanisms for extended rail track systems are desired.

SUMMARY OF THE INVENTION

According to one aspect of the present invention, a track system includes a track member with an elongate shaft mounted thereto. At least one support mechanism is mounted to the track member. The at least one support mechanism includes a housing. An engagement feature includes first and second engagement members spaced-apart from one another to define a receiving area therebetween. The first and second engagement members are operable between deployed and retracted positions relative to the housing. The elongate shaft is received in the receiving area when the first and second engagement members are in the deployed position.

According to another aspect of the present invention, a support mechanism includes a housing having an interior portion. An engagement feature includes upper and lower engagement members vertically spaced-apart from one another to define a receiving area therebetween. The engagement feature is operable between deployed and retracted positions relative to the housing. The upper and lower engagement members extend outwardly from the interior portion of the housing when the engagement feature is in the deployed position. The upper and lower engagement members are at least partially received within the interior portion of the housing when the engagement feature is in the retracted position. A biasing mechanism is operably coupled to the engagement feature to bias the engagement feature towards the deployed position.

According to yet another aspect of the present invention, a track system includes a track member having an interior portion and an exterior portion. An elongate shaft is mounted within the interior portion of the track member. At least one support mechanism is mounted to the exterior portion of the track member. The at least one support mechanism includes a housing. An engagement feature includes first and second engagement members spaced-apart from one another to define a receiving area therebetween. The first and second engagement members are operable between deployed and retracted positions. The elongate shaft is supported in the receiving area by the first and second engagement members when the first and second engagement members are in the deployed position. The elongate shaft is spaced-apart from the receiving area when the first and second engagement members are in the retracted position. A carriage assembly is operably coupled to the elongate shaft for movement therealong by a coupling assembly. The coupling assembly includes a slider bracket having at least one ramp portion configured to contact and guide the first and second engagement members from the deployed position to the retracted position as the carriage assembly is driven past the at least one support mechanism along the elongate shaft.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 13A is a fragmentary top perspective view of a shaft having upper and lower notches; and FIG. 13B is a fragmentary top perspective view of the shaft of FIG. 13A with an engagement feature of a support mechanism engaging the notches of the shaft.

DETAILED DESCRIPTION OF THE PREFERRED EMBODIMENTS

Figure 1:
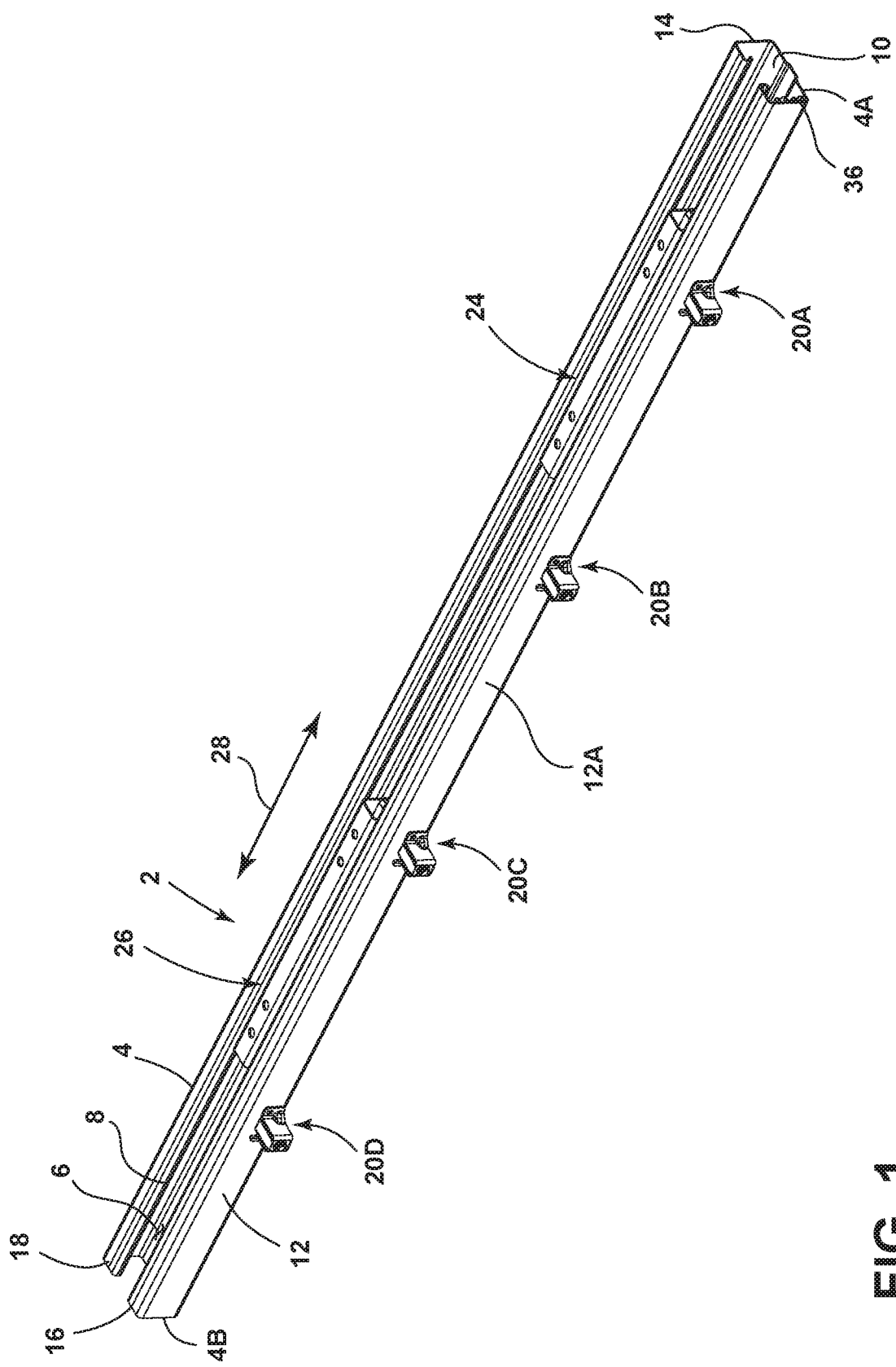
FIG. 1 is a top perspective view of a track system.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a track system 2 is shown including a track member 4 having a generally U-shaped cross section. The track member 4 includes first and second ends 4A, 4B and an interior portion 6 with a centrally disposed slot 8 opening into the interior portion 6. The track member 4 further includes a bottom wall 10 having first and second sidewalls 12, 14 upwardly extending therefrom, and first and second upper walls 16, 18 inwardly extending towards one another, yet spaced-apart to define the centrally disposed slot 8. As further shown in FIG. 1, a plurality of support mechanisms 20A-20D are shown operably coupled to an outer surface 12A of sidewall 12. The outer surface 12A of the track member 4 is considered part of an overall exterior portion of the track member 4. In use, the support mechanisms 20A-20D are used to selectively support an elongate shaft 22 (FIG. 2) that is contemplated to be mounted within the interior portion 6 of the track member 4. As further shown in FIG. 1, first and second carriage assemblies 24, 26 are shown disposed within the interior portion 6 of the track member 4 for movement along the centrally disposed slot 8 between fore and aft positions in a direction as indicated by arrow 28. In use, the first and second carriage assemblies 24, 26 are configured to support a variety of components within a vehicle interior that are adjustably supported by the track system 2 for movement within a vehicle interior. Such components supported by the track system 2 could include seat assemblies, consoles, storage compartments, and other such components that are suitable for adjusting a position thereof within a vehicle interior.

The track system 2 is contemplated to be an elongate track system which may include multiple track members for supporting a vehicle component. For instance, a second track member mirroring track member 4 may be used with the track system 2 to support opposed sides of a seat assembly along parallel track members. The extended length of the track system 2 allows for increased adjustability in a component's position as supported thereon. In the example of a seat assembly, it may be useful for the track system 2 to provide elongate adjustable support when a seat assembly is rotated by a user between forward-facing and rearward-facing configurations. In supporting such a seat assembly, the track system 2 provides for ample adjustability to move the seat assembly along the track members for accommodating legroom of a seat occupant in both the forward-facing and rearward-facing configurations. It is contemplated that the track system 2 provides a range of motion of approximately 1500 millimeters or more. The track member 4 shown in FIG. 1 includes evenly spaced support mechanisms 20A-20D which are contemplated to be placed approximately 300 millimeters along a 1500 millimeter track member 4. In standard track systems of approximately 600 millimeters, the need for intermediate support may be obviated. However, with the elongate track system 2 of the present concept, intermediate support for the elongate shaft 22 is provided via the support mechanisms 20A-20D along the length of the track member 4 to ensure that the elongate shaft 22 is properly supported within the interior portion 6 of the track member 4.

Figure 2:
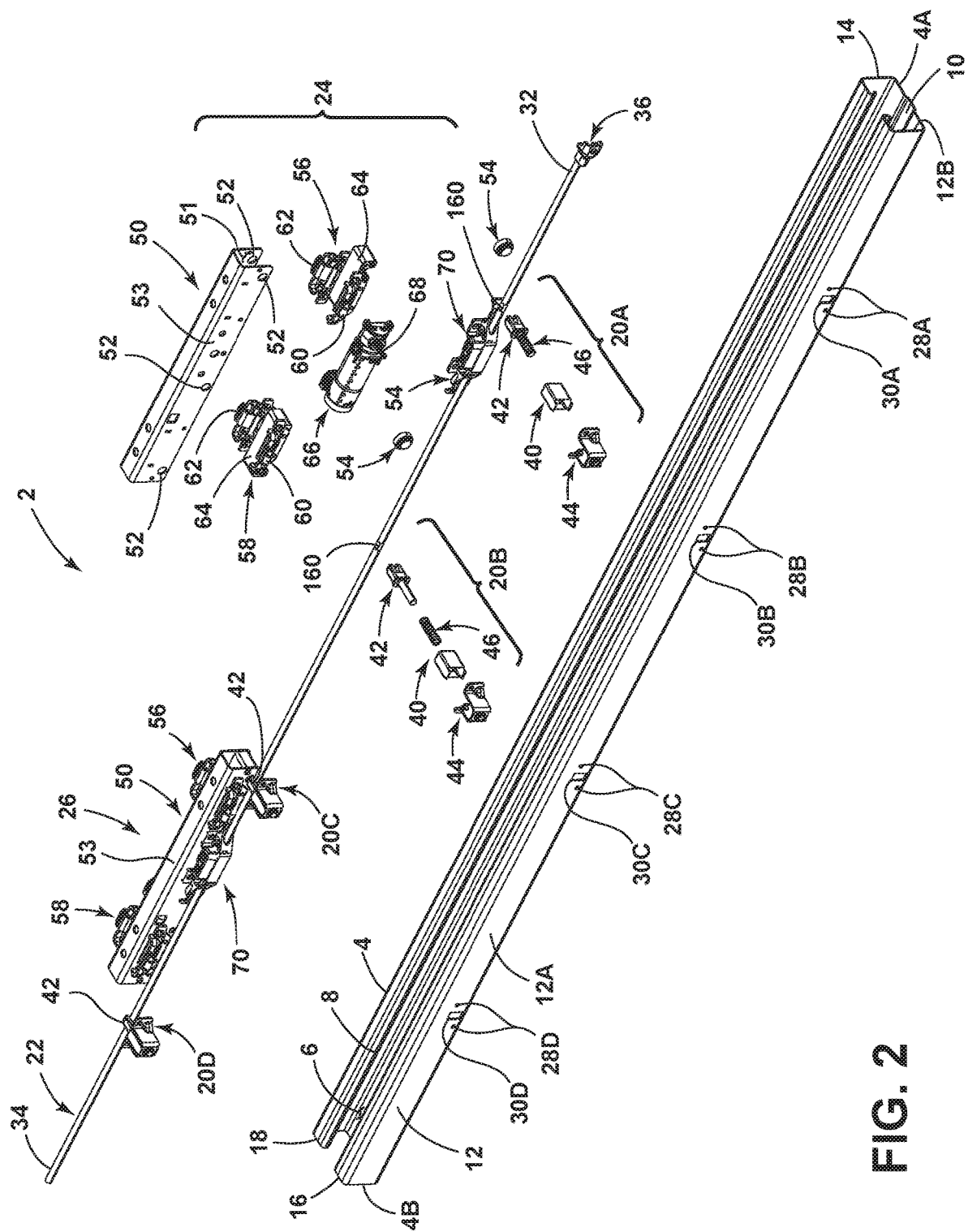
FIG. 2 is a top perspective view of the track system of FIG. 1 with components exploded away therefrom.

Referring now to FIG. 2, the support mechanisms 20A-20D are shown exploded away from the track member 4, along with the first and second carriage assemblies 24, 26. Further, the elongate shaft 22 is shown exploded away from the interior portion 6 of the track member 4. With the support mechanisms 20A-20D removed from the track member 4, access apertures 30A-30D are shown disposed through the sidewall 12 of the track member 4. Further, mounting apertures 28A-28D are shown disposed on opposite sides of the access apertures 30A-30D, respectively. In use, the mounting apertures 28A-28D are used to mount the support mechanisms 20A-20D, respectively, to an exterior portion of the track member 4, such as the outer surface 12A of sidewall 12. The access apertures 30A-30D open into the interior portion 6 of the track member 4, such that features of the support mechanisms 20A-20D can access the elongate shaft 22 as mounted within the interior portion 6 of the track member 4 in use. In FIG. 2, the elongate shaft 22 is shown as having first and second ends 32, 34 with a mounting bracket 36 shown positioned on the first end 32 for mounting the elongate shaft 22 to an inner surface 12B of the sidewall 12 at the first end 4A of the track member 4. Mounting bracket 36 is also shown in FIG. 1 on the inner surface 12B of the sidewall 12. It is further contemplated that the second end 34 of the elongate shaft 22 may also include a mounting bracket similar to mounting bracket 36 to couple the elongate shaft 22 to the second end 4B of the track member 4.

As further shown in FIG. 2, the support mechanisms 20A and 20B are exploded away from the elongate shaft 22, to reveal upper notches 160 disposed on the elongate shaft 22. Support mechanisms 20C and 20D are shown in FIG. 2 as being engaged with the elongate shaft 22. With specific reference to support mechanism 20B, the support mechanisms 20A-20D each include a housing 40, an engagement feature 42, a support bracket 44, and a biasing mechanism 46. In use, the engagement feature 42 is contemplated to move between deployed and retracted positions relative to the housing 40. The biasing mechanism 46 is contemplated to couple to the engagement feature 42, as shown with specific reference to support mechanism 20A in FIG. 2, to bias the engagement feature 42 to the deployed position. The housing 40 is configured to couple to the support bracket 44 which is configured to mount to the exterior of the track member 4, such as outer surface 12A of sidewall 12 at mounting apertures 28B. The access apertures 30A-30D are configured to provide access to the interior portion 6 of the track member 4 for the engagement features 42 to engage the elongate shaft 22 when the engagement features 42 are in the extended or deployed position. Thus, the support mechanisms 20A-20D are mounted to the outer surface 12A of the track member 4, as shown in FIG. 1 over the access apertures 30A-30D, such that, the access apertures 30A-30D provide access for the engagement features 42 to reach the interior portion 6 of the track member 4 in which the elongate shaft 22 is mounted. In this way, the support mechanisms 20A-20D can selectively support the elongate shaft 22 at spaced intervals along a length of the elongate shaft 22 between the first and second ends 32, 34 thereof. The selective engagement of the elongate shaft 22 by the support mechanisms 20A-20D is further described below.

With further reference to FIG. 2, the first carriage assembly 24 is shown in an exploded view while the second carriage assembly 26 is shown in an assembled configuration and operably coupled to the elongate shaft 22 between support mechanisms 20C and 20D. In FIG. 2, the engagement features 42 of support mechanisms 20C and 20D are shown engaged with the elongate shaft 22 to support the same under the weight of an object supported on the second carriage assembly 26. As noted above, the first carriage assembly 24 is shown in an exploded view, and the parts thereof will now be described and are contemplated to also describe the component parts of the second carriage assembly 26. As shown in FIG. 2, the first carriage assembly 24 includes a body portion 50 having a generally inverted U-shaped configuration. The body portion 50 further includes a plurality of mounting apertures 52 which can be used to mount rollers 54 to the body portion 50 for providing rolling support of the first carriage assembly 24 along the bottom wall 10 of the track member 4. As further shown in FIG. 2, the first carriage assembly 24 further includes first and second guide assemblies 56, 58 which each include first and second guide members 60, 62 disposed on opposite sides of a spacer member 64. In use, the guide members 60, 62 are configured to engage inner surfaces of the top walls 16, 18 of the track member 4 as the first carriage assembly 24 moves along the length of the track member 4. The first carriage assembly 24 further includes an actuator 66 having a drive shaft 68 that is configured to rotate as powered by the actuator 66 to drive movement of the first carriage assembly 24 along the elongate shaft 22, as further described below. In assembly, the first and second guide assemblies 56, 58 and the actuator 66 are contemplated to be mounted within an interior portion 51 of the body portion 50 of the first carriage assembly 24. A coupling assembly 70 is configured to couple to an exterior surface 53 of the body portion 50. As shown in FIG. 2, the coupling assembly 70 is shown engaged with the elongate shaft 22, as further described below. With reference to the second carriage assembly 26, the coupling assembly 70 is shown coupled to the exterior surface 53 of the body portion 50 of the second carriage assembly 26, and further coupled to the elongate shaft 22. In this way, the coupling assemblies 70 couple the first and second carriage assemblies 24, 26 to the elongate shaft 22 for movement therealong, as further described below.

Figure 3:
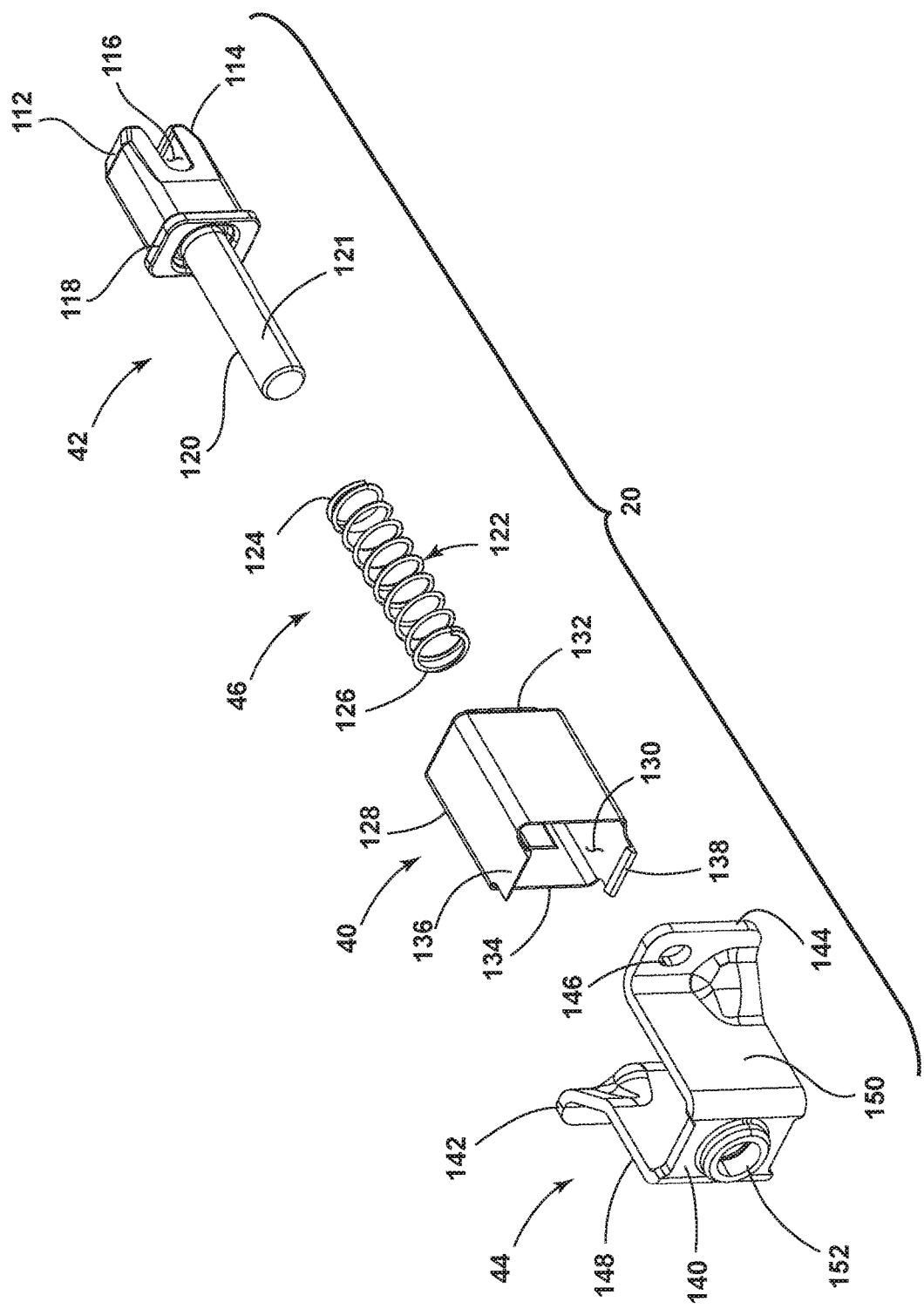
FIG. 3 is an exploded top perspective view of a support mechanism.

Referring now to FIG. 3, a support mechanism 20 is shown and contemplated to represent the support mechanisms 20A-20D shown in FIGS. 1 and 2. In FIG. 3, the support mechanism 20 includes the engagement feature 42 having first and second engagement members 112, 114 that are vertically spaced-apart from one another to define a receiving area 116 therebetween. The engagement feature 42 further includes an abutment wall 118 and a stem portion 120 rearwardly extending from the abutment wall 118. Thus, in assembly, the engagement feature 42 includes the first and second engagement members 112, 114 outwardly extending from the stem portion 120. The first and second engagement members 112, 114 may be referred to herein as upper and lower engagement members as they are configured to engage upper and lower sides of the elongate shaft 22, as further described below. As further shown in FIG. 3, the biasing mechanism 46 is shown in the form of a coil spring 122 having first and second ends 124, 126. In use, the biasing mechanism 46 is received on an outer surface 121 of the stem portion 120 of the engagement feature 42, such that the first end 124 abuts the abutment wall 118, and the second end 126 is configured to abut the support bracket 44 at a rear wall 140 thereof. As further shown in FIG. 3, the housing 40 of the support mechanism 20 includes an outer wall 128 defining an interior portion 130 having front and rear openings 132, 134. It is contemplated that the housing 40 has a cross-sectional configuration that closely matches the contours of the abutment wall 118 of the engagement feature 42. The engagement feature 42 is configured to slidingly engage the housing 40 within the interior portion 130 thereof. Specifically, in assembly, the engagement feature 42 enters into the rear opening 134 of the housing 40 until the first and second engagement members extend outwardly from the front opening 132 of the housing 40 (as best shown in FIG. 13B). The abutment wall 118 of the engagement feature 42 is configured to abut an inner surface of a front retaining wall 135 (FIG. 13B) of the housing 40 when the engagement feature 42 is in the deployed position to keep the engagement feature 42 from passing through the front opening 132.

As further shown in FIG. 3, the housing 40 includes upper and lower clip members 136, 138 which are contemplated to couple to the rear wall 140 of the support bracket 44. As further shown in FIG. 3, the support bracket 44 includes mounting portions 142, 144 having mounting apertures 146 disposed therethrough which are configured to align with the mounting apertures 28A-28D of the track member 4. Rearwardly extending sidewalls 148, 150 are interconnected by the rear wall 140 of the support bracket 44. The support bracket 44 further includes a receiving aperture 152 disposed through the rear wall 140. The stem portion 120 of the engagement feature 42 is contemplated to be slidably received through the receiving aperture 152 of the support bracket 44 between extended and retracted positions as the engagement feature 42 plunges between the deployed and retracted positions relative to the housing 40. In assembly, rear wall 140 of the support bracket 44 covers the rear opening 134 of the housing 40 to close off the same, such that the engagement feature 42 is positively captured within the interior portion 130 of the housing 40, yet slideably disposed therein.

Figure 4:
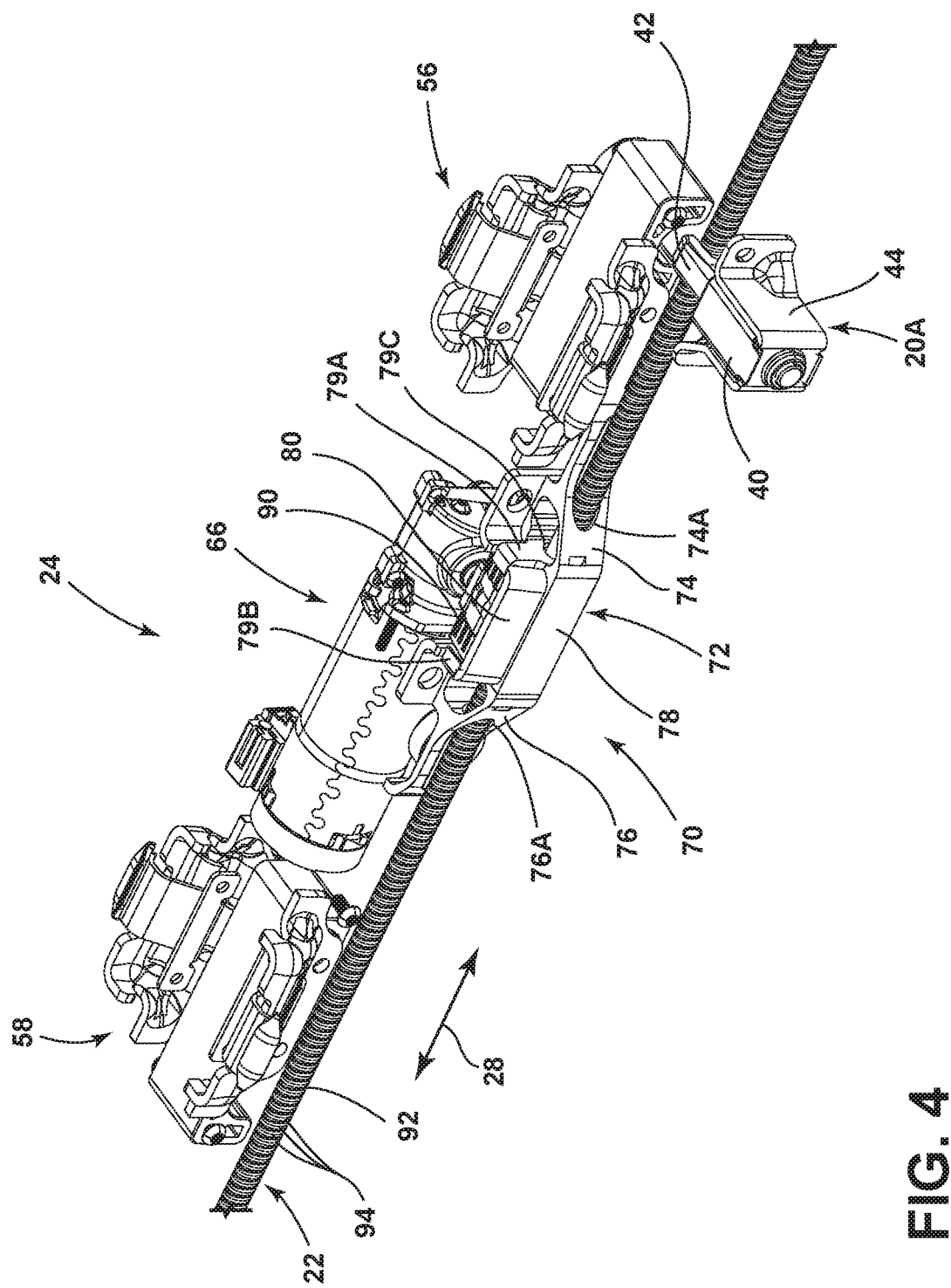
FIG. 4 is a top perceptive view of a coupling assembly coupled to a shaft.

Referring now to FIG. 4, the first carriage assembly 24 is shown with the body portion 50 removed therefrom to reveal the first and second guide assemblies 56, 58 and the actuator 66. As further shown in FIG. 4, the coupling assembly 70 which couples to the exterior surface 53 of the body portion 50 (FIG. 2) is shown engaged with the elongate shaft 22. Specifically, the coupling assembly 70 includes a slider bracket 72 having first and second ramp portions 74, 76 disposed on opposite sides thereof with an intermediate portion 78 disposed therebetween. The first and second ramp portions 74, 76 are disposed at inclined angles relative to the elongate shaft 22 and are opposed angles to one another. The first and second ramp portions 74, 76 further include receiving apertures 74A, 76A, respectively, through which the elongate shaft 22 is received. In this way, the slider bracket 72 serves as a coupling between the first carriage assembly 24 and the elongate shaft 22. The specific configuration of the slider bracket 72 allows for the engagement feature 42 of the various support mechanisms 20A-20D to move from the deployed position, shown in FIG. 4, to a retracted position, shown in FIG. 10B. This is due to the first carriage assembly 24 moving along the elongate shaft 22 in the direction as indicated by arrow 28, such that the first and second ramp portions 74, 76 of the slider bracket 72 can act as introductory ramps which urge the engagement feature 42 of an associated support mechanism into the retracted position, and then guide the same engagement feature 42 towards the deployed position as the carriage assembly, such as first carriage assembly 24, is driven past the associated support mechanism, such as support mechanism 20A. The interaction of the slider bracket 72 of the coupling assembly 70 with the support mechanisms 20A-20D of the present concept is further described below with reference to FIGS. 8A-12B. As further shown in FIG. 4, the slider bracket 72 is shown coupled to a mounting bracket 80 in which a gear box 90 is disposed. The slider bracket 72 may be comprised of multiple parts to enable the coupling of the slider bracket 72 to a carriage assembly, the elongate shaft 22 and the mounting bracket 80.

Figure 5:
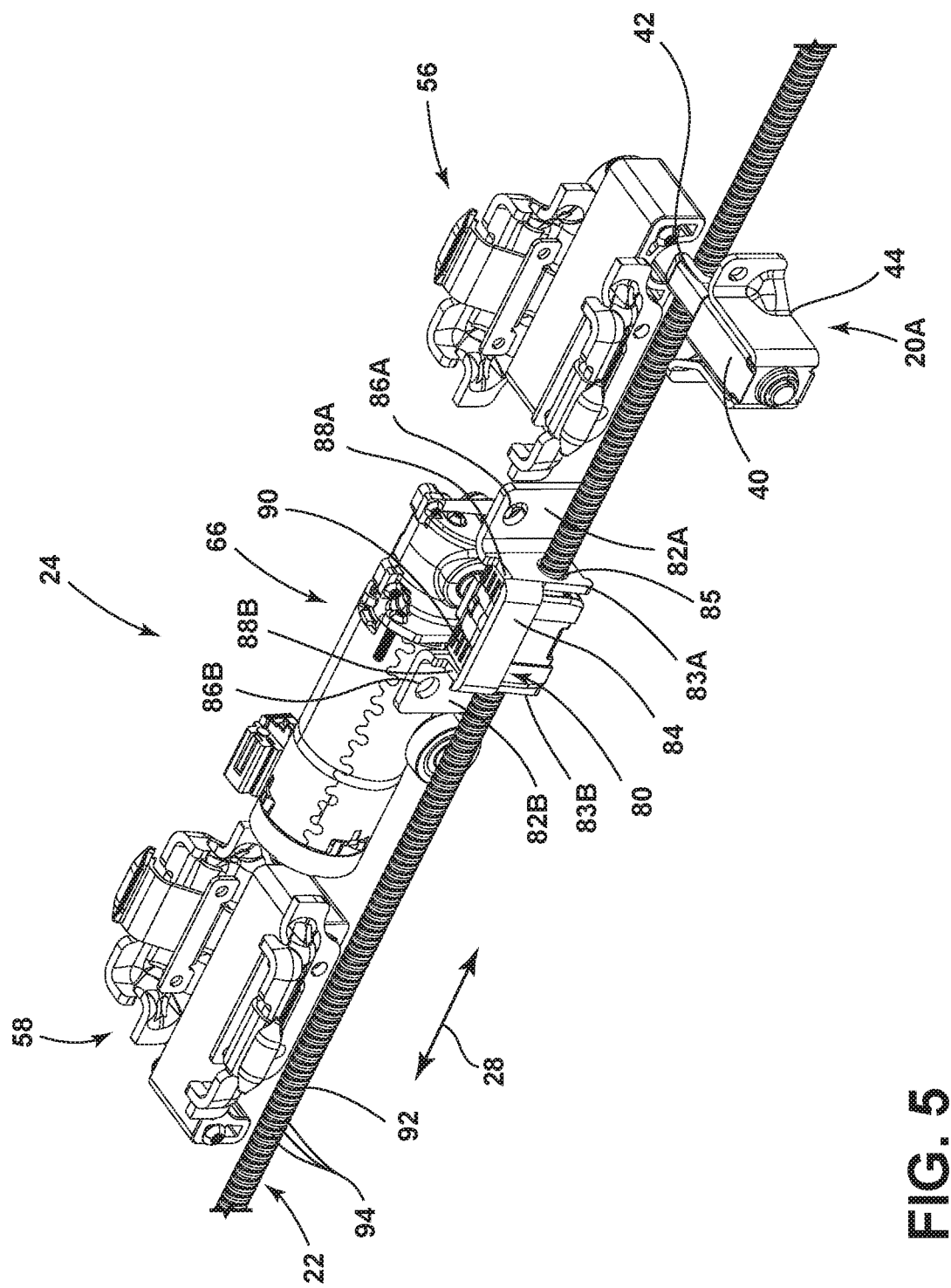
FIG. 5 is a top perceptive view of the coupling assembly of FIG. 4 with a slider bracket removed therefrom to reveal a mounting bracket.

Referring now to FIG. 5, the mounting bracket 80 includes mounting portions 82A, 82B having mounting apertures 86A, and 86B, respectively. The mounting apertures 86A, 86B are used to mount the mounting bracket 80 to the exterior surface 53 of the body portion 50 of a carriage assembly, such as first carriage assembly 24 described above. The mounting bracket 80 further includes sidewalls 83A, 83B which outwardly extend from the mounting portions 82A, 82B, respectively. The sidewalls 83A, 83B include receiving apertures 85 through which the elongate shaft 22 is received. The sidewalls 83A, 83B are interconnected by an intermediate portion 84 and include notches 88A, 88B in which upwardly extending clip members 79A, 79B (FIG. 4) of the slider bracket 72 are received. The interconnection of the slider bracket 72 and the mounting bracket 80 is best shown in FIG. 4. The upwardly extending clip members 79A, 79b of the slider bracket 72 also include access apertures 79C through which the elongate shaft 22 is received. In assembly, and with further reference to FIG. 5, the mounting bracket 80 is disposed around and substantially surrounds a gear box 90 which is mounted on the elongate shaft 22 and gearingly engaged therewith.

Figure 6:
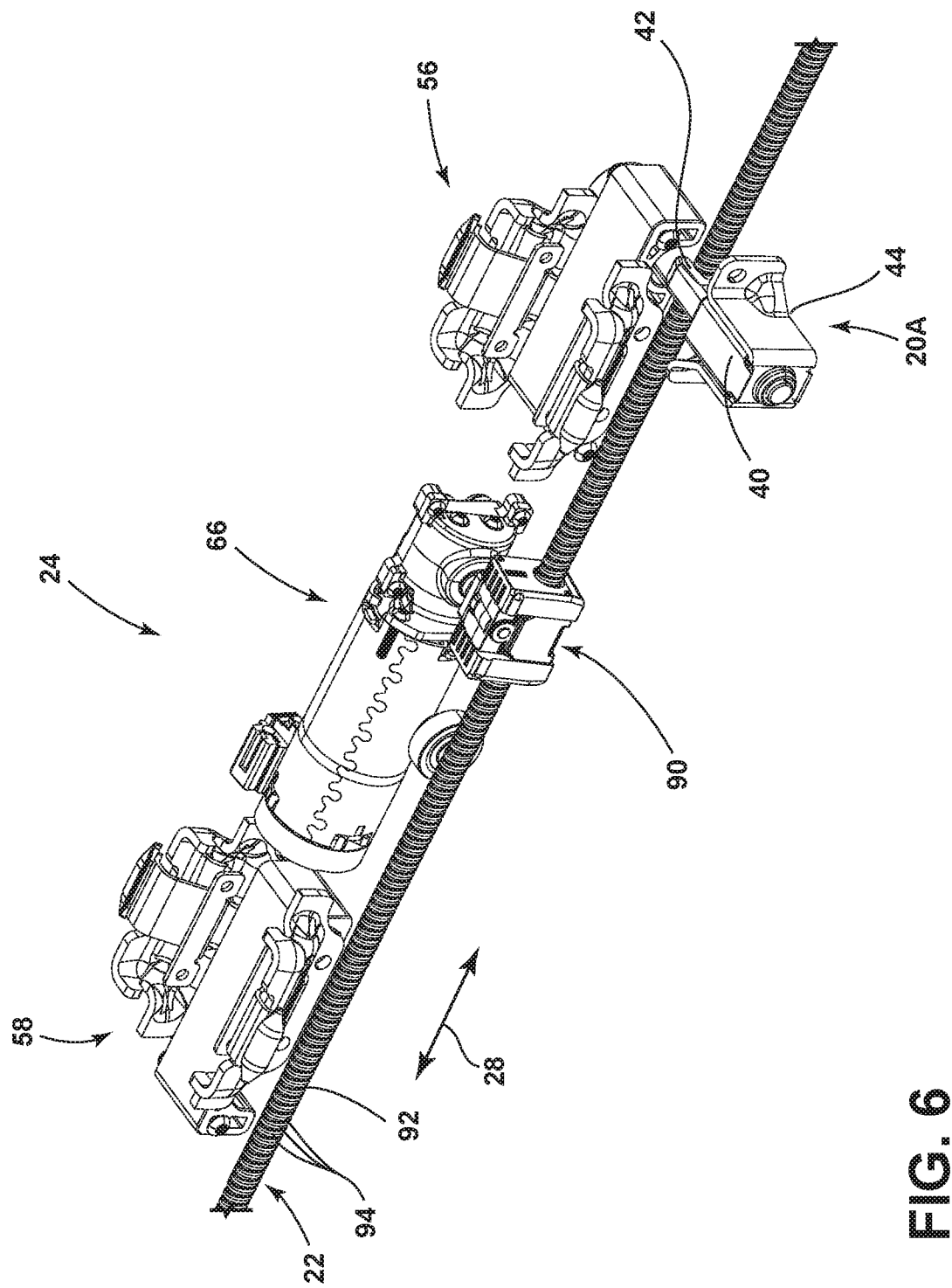
FIG. 6 is a top perceptive view of the coupling assembly of FIG. 5 with the mounting bracket removed therefrom to reveal a gear box.

Referring now to FIG. 6, gear box 90 is shown and is contemplated to include a geared system which can engage the elongate shaft 22 to power movement of a carriage assembly along the elongate shaft 22. As shown in FIGS. 4-6, the elongate shaft 22 includes a threaded cylindrical body portion 92 having individual threads 94 disposed therealong which are contemplated to be continual progressive threads to which the gear box 90 is gearingly engaged. As used herein, the term "gearingly engaged" refers to a geared relationship between components, wherein movement of one component drives movement of the other, and or drives movement of the moving component relative to the other. With specific reference to the geared relationship between the elongate shaft 22 and the gear box 90, the gear box 90 is contemplated to include a threaded member that is inversely threaded relative to the threaded cylindrical body portion 92 of the elongate shaft 22. In this way, rotation of the threaded member of the gear box 90 drives movement of a carriage assembly, to which the gear box 90 is coupled, along the length of the elongate shaft 22.

Figure 7:
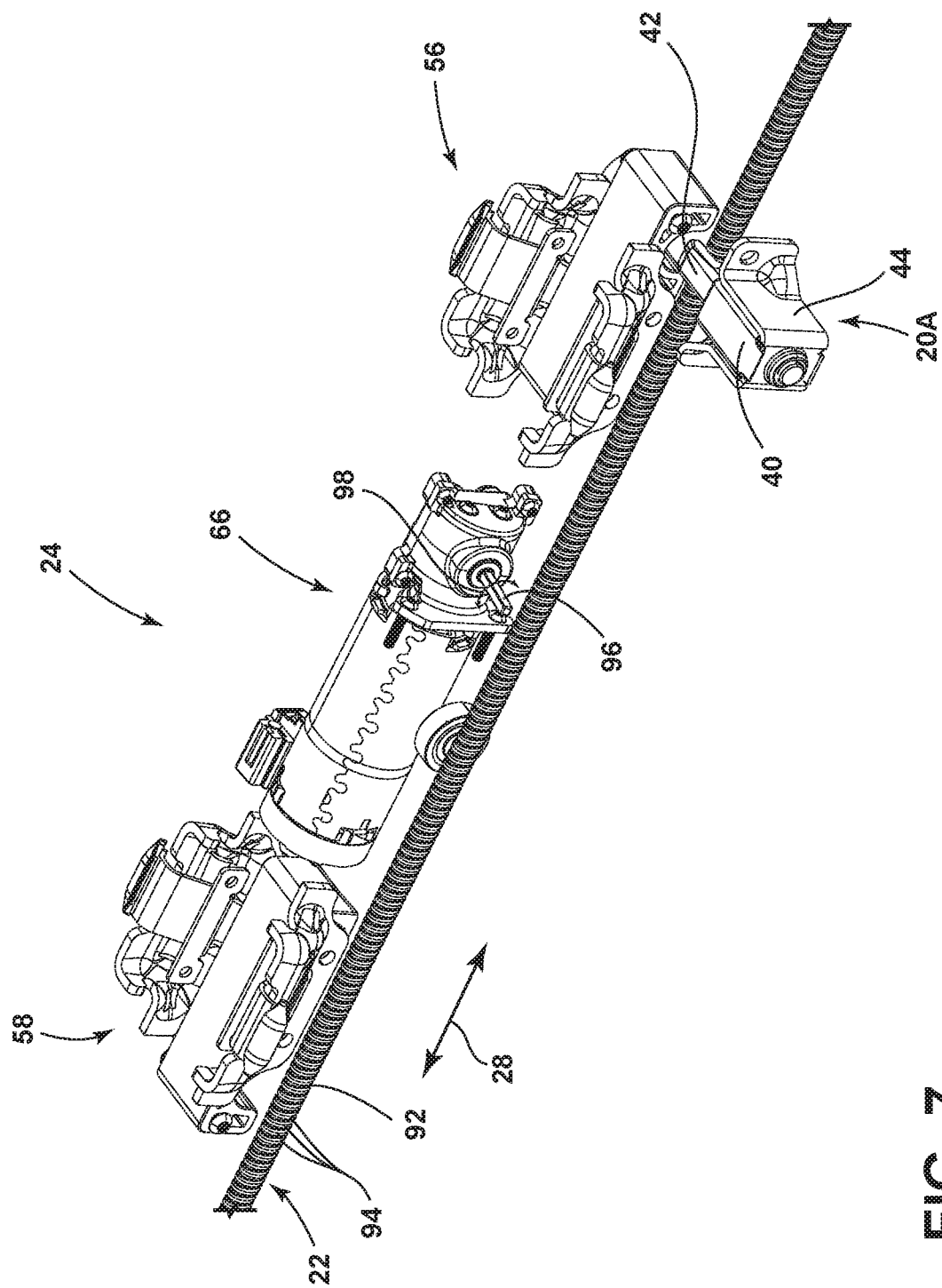
FIG. 7 is a top perceptive view of the coupling assembly of FIG. 6 with the gear box removed therefrom to reveal a drive shaft of an actuator.

Referring now to FIG. 7, the actuator 66 is shown having a drive shaft 96 outwardly extending therefrom. The drive shaft 96 is contemplated to engage the gear box 90 in such a manner that the drive shaft 96 controls rotational movement of the threaded member of the gear box 90. The drive shaft 96 is contemplated to rotate in the direction as indicated by arrow 98 to move a carriage assembly in both forward and rearward directions along the elongate shaft 22 as indicated by arrow 28. The actuator 66 is contemplated to be coupled to a power source of a vehicle for powering movement of an associated component coupled to a carriage assembly in which the actuator 66 is disposed.

Figure 8A:
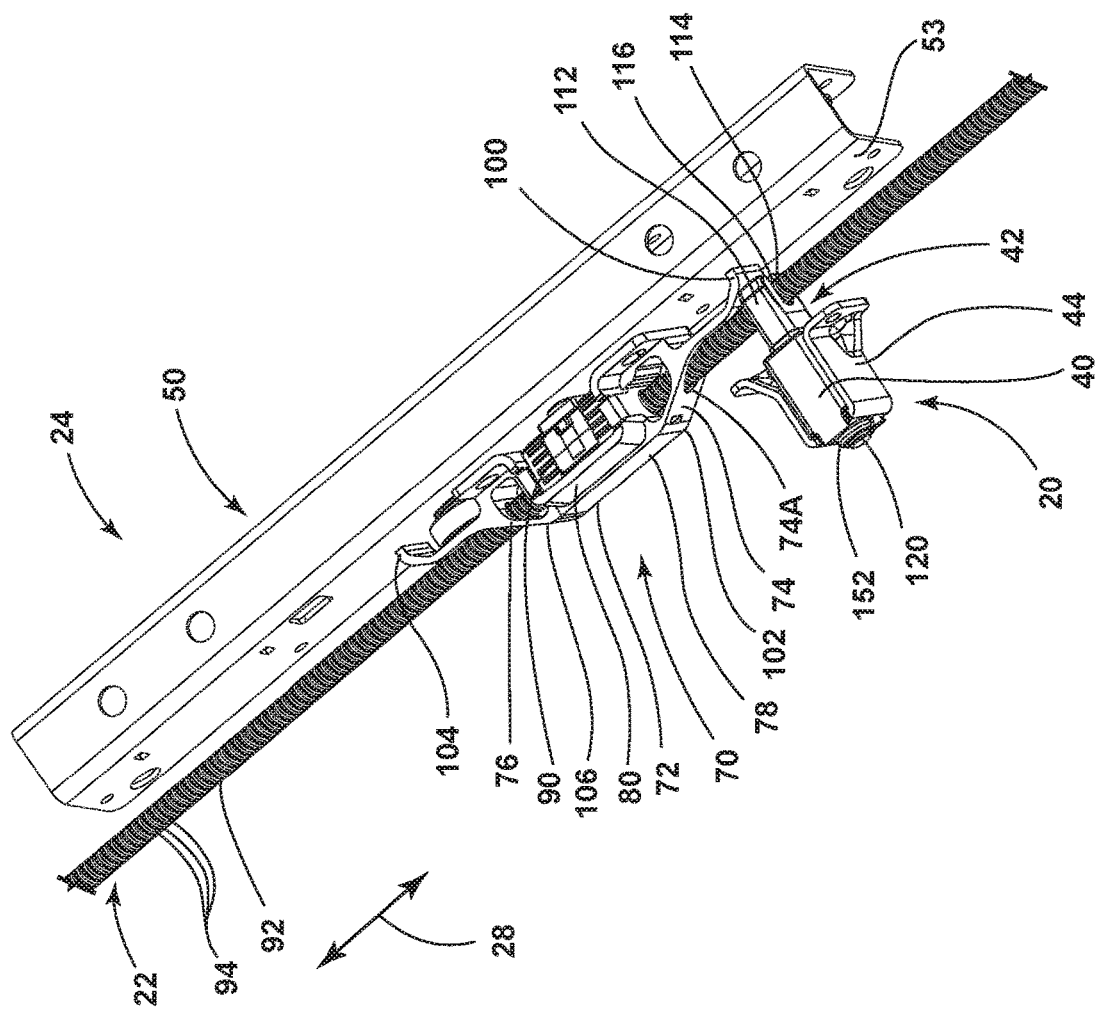
FIG. 8A is a top perspective view of a carriage assembly coupled to a shaft by a coupling assembly and a support mechanism coupled to the shaft by an engagement feature in a deployed position.
Figure 8B:
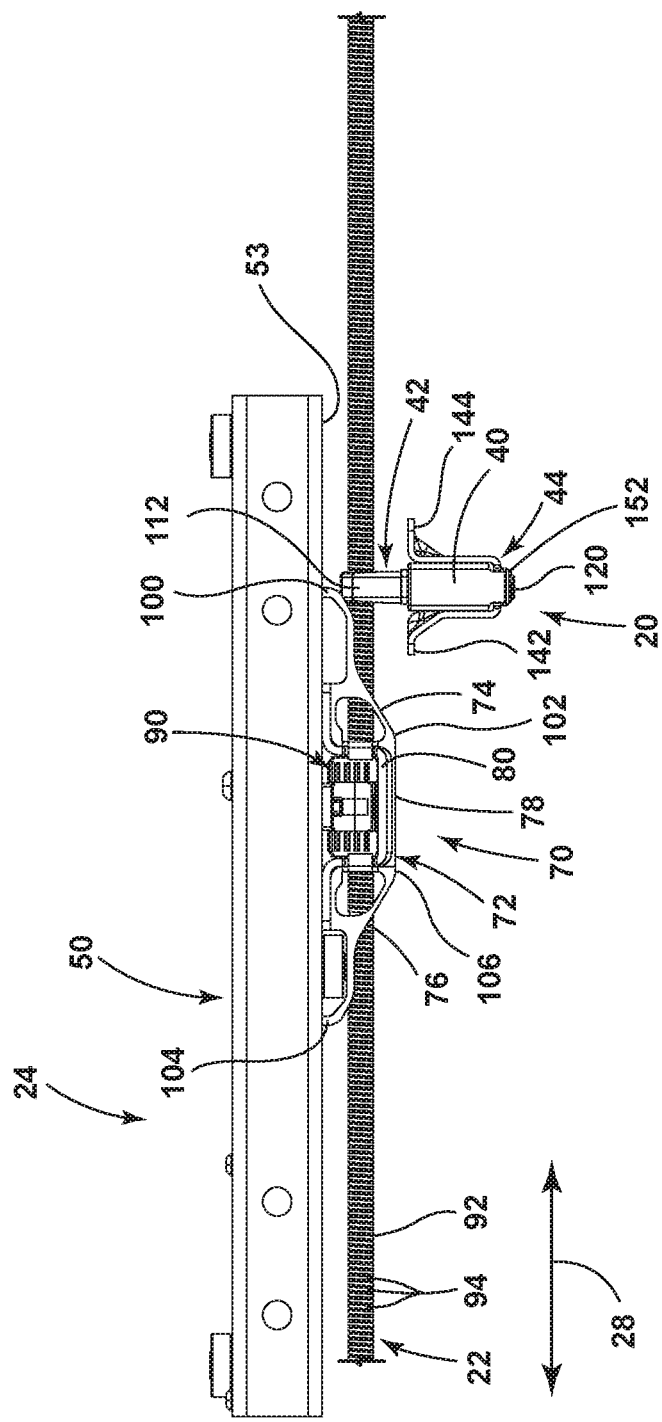
FIG. 8B is a top plan view of the support mechanism and carriage assembly of FIG. 8A.

Referring now to FIGS. 8A and 8B, the first carriage assembly 24 is shown having the coupling assembly 70 coupled to the exterior surface 53 of the body portion 50. The coupling assembly 70 is shown engaged with the elongate shaft 22. As further shown in FIGS. 8A and 8B, a support mechanism 20 is shown engaged with the elongate shaft 22. In FIGS. 8A and 8B, the track member 4 (FIG. 1) has been removed to reveal the elongate shaft 22 and the coupling assembly 70 which are normally disposed within the interior portion 6 of the track member 4. With the track member 4 removed, the engagement feature 42 of the support mechanism 20 is shown engaged with the elongate shaft 22 which is normally an engagement occurring within the interior portion 6 of the track member 4. With specific reference to FIGS. 8A-12B, the track member 4 has been removed to specifically detail the interaction between the support mechanism 20 and the coupling assembly 70 of the carriage assembly 24 as the carriage assembly 24 moves past the fixedly mounted support mechanism 20. As noted above, the first carriage assembly 24 can move in forward and rearward directions along the elongate shaft 22. For the purposes of the descriptions of the FIGS. 8A-12B, it is contemplated that the first carriage assembly 24 is moving from left to right along the elongate shaft 22.

With specific reference to FIG. 8A, the first and second engagement members 112, 114 are shown outwardly extending from the interior portion 130 of the housing 40 to couple to upper and lower portions of the elongate shaft 22. Specifically, it is contemplated that the first and second engagement members 112, 114 are received within notches disposed on the elongate shaft 22 as further described below with reference to FIGS. 13A, 13B. In FIG. 8A, the first and second engagement members 112, 114 are fully engaged with the elongate shaft 22 as the engagement feature 42 of the support mechanism 20 is shown in the fully deployed position. As the first carriage assembly 24 moves from left to right along the elongate shaft 22, the slider bracket 72 will make contact with the engagement feature 42 to urge the engagement feature 42 from the deployed position to the retracted position given the inclined angle of the first ramp portion 74 of the slider bracket 72. As used herein, the movement from the deployed position to the retracted position may be used to describe the overall engagement feature 42, and/or the first and second engagement members 112, 114 thereof. In the deployed position shown in FIG. 8A, the elongate shaft 22 is shown received within the receiving area 116 defined between the vertically spaced-apart first and second engagement members 112, 114 of the engagement feature 42. As specifically shown in FIG. 8A, the first ramp portion 74 includes a first end 100 and a second end 102. The receiving aperture 74A of the first ramp portion 74 is shown disposed between the first end 100 and the second end 102 of the first ramp portion 74. As shown in FIG. 8A, the first end 100 of the first ramp portion 74 is shown disposed on a first side of the elongate shaft 22, while the second end 102 of the first ramp portion 74 is disposed on a second side of the elongate shaft 22 that is opposed to the first side of the elongate shaft 22. Thus, the angled incline of the first ramp portion 74 is configured to draw the first and second engagement members 112, 114 from the first side of the elongate shaft 22 to a second side of the elongate shaft 22 to disengage the elongate shaft 22, as further described below.

Figure 9A:
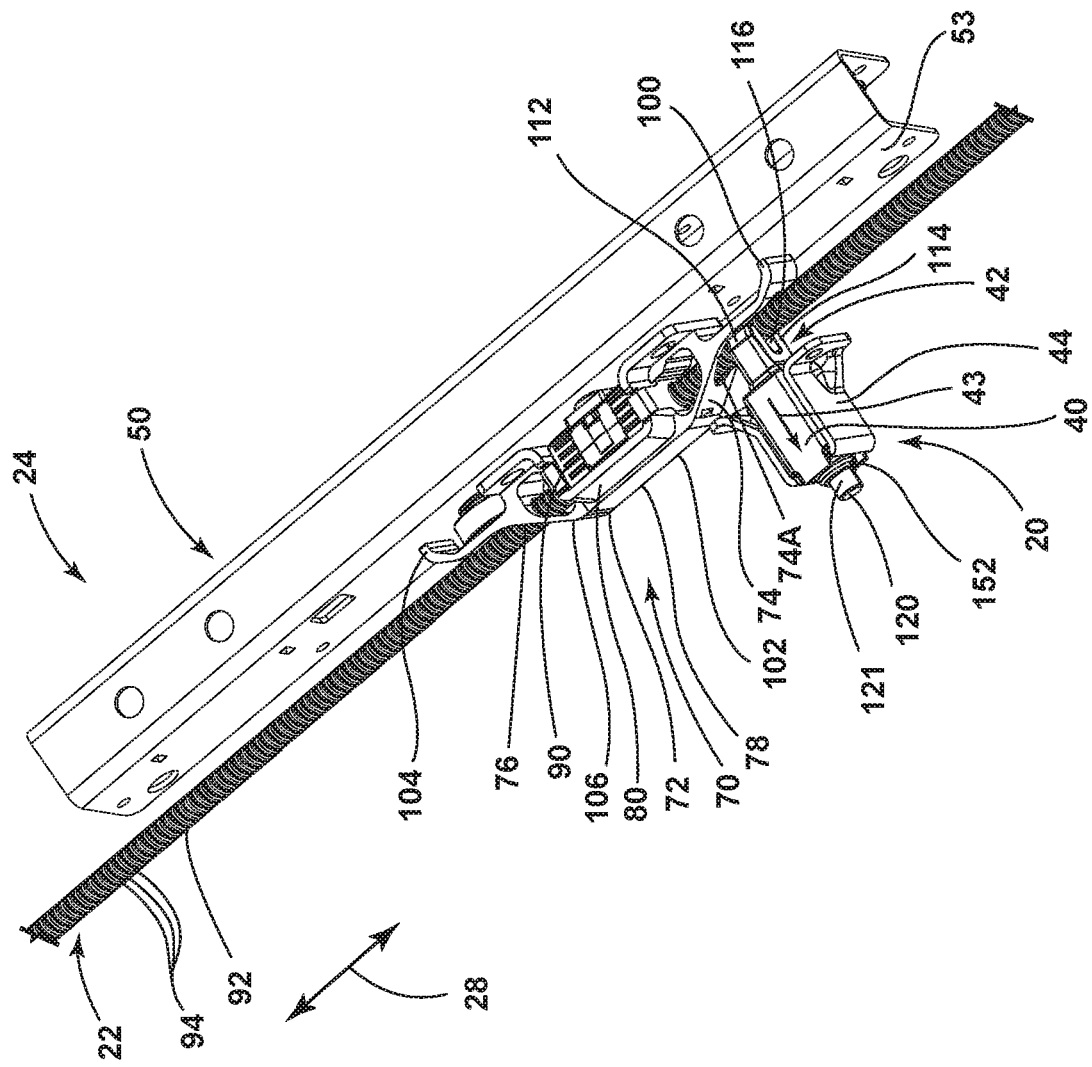
FIG. 9A is a top perspective view of the support mechanism and carriage assembly of FIG. 8A, with the engagement feature of the support mechanism engaging the coupling assembly to partially retract the engagement feature.
Figure 9B:
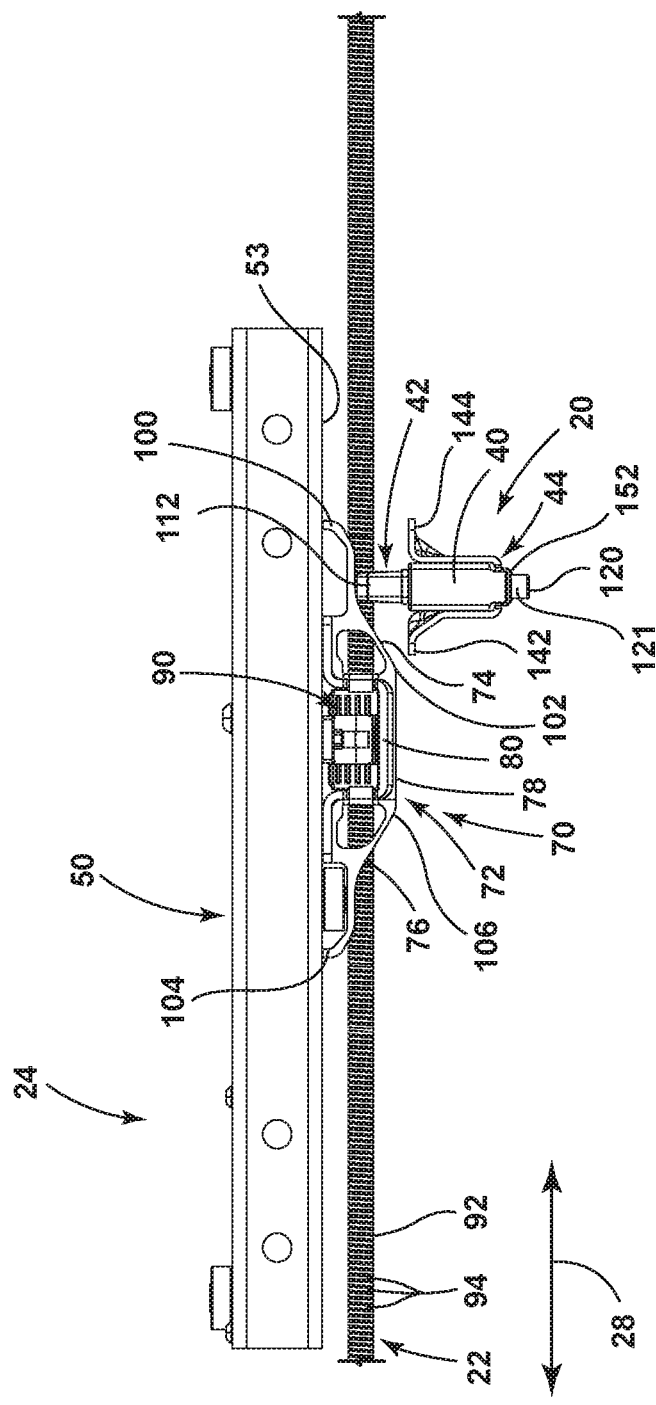
FIG. 9B is a top plan view of the support mechanism and carriage assembly of FIG. 9A.

Referring now to FIGS. 9A and 9B, the first carriage assembly 24 has moved from left to right relative to the position of the carriage assembly 24 shown in FIGS. 8A and 8B. With this movement of the first carriage assembly 24, the first ramp portion 74 of the slider bracket 72 has contacted the first and second engagement members 112, 114 to then move the engagement member 42 in a rearward direction as indicated by arrow 43. Movement of the engagement feature 42 in the direction as indicated by arrow 43 moves the engagement feature 42 from the deployed position (FIGS. 8A, 8B) towards the retracted. As such, the first ramp portion 74 of the slider bracket 72 acts as an introductory ramp to disengage the engagement feature 42 of the support mechanism 20 from the elongate shaft 22 to allow for the first carriage assembly 24 to pass by the support mechanism 20. Thus, in FIGS. 9A and 9B, the engagement feature 42 is in a partially retracted position, such that the stem portion 120 of the engagement feature 42 is shown partially extended through the receiving aperture 152 of the support bracket 44 of the support mechanism 20.

Figure 10A:
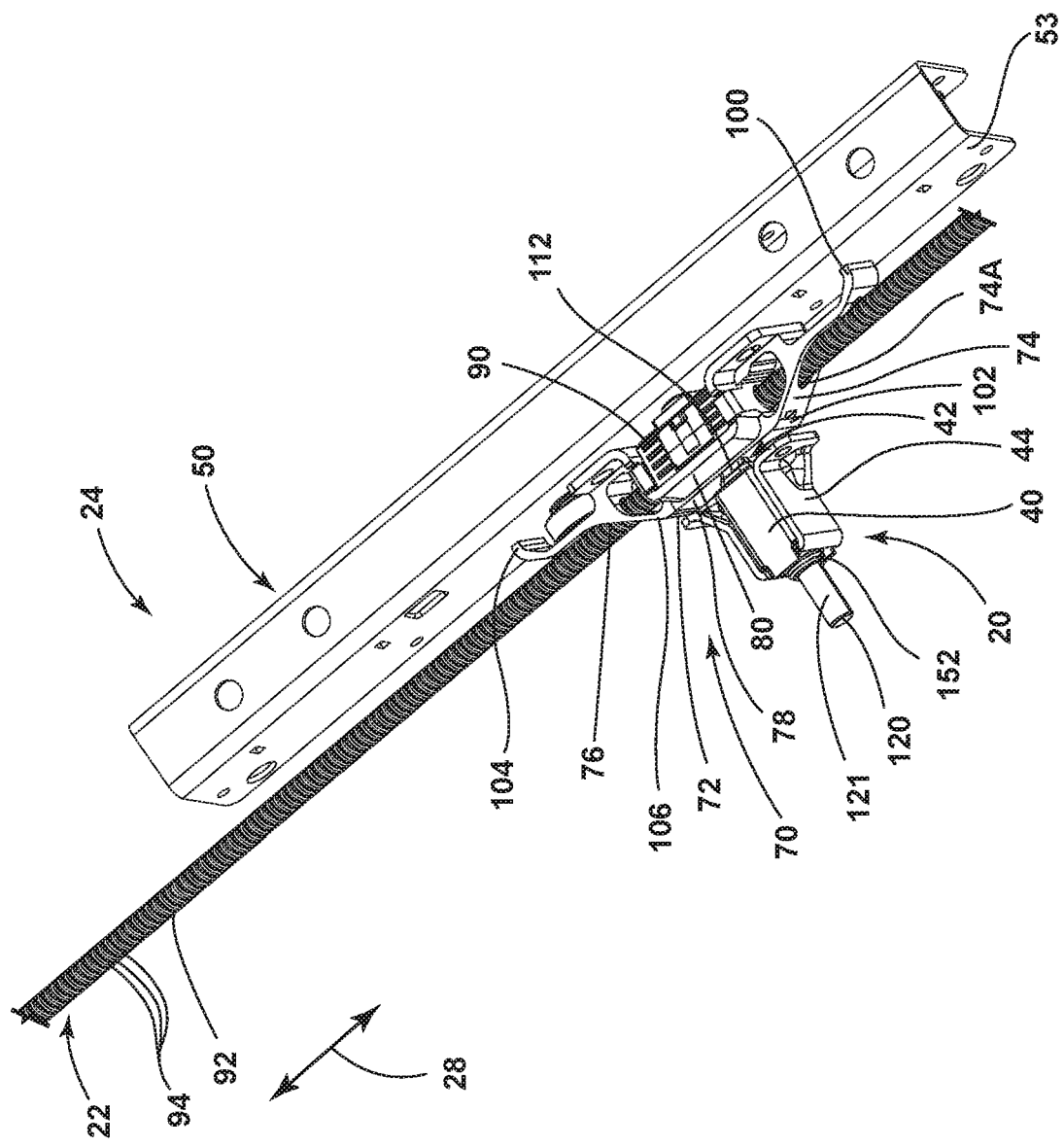
FIG. 10A is a top perspective view of the support mechanism and carriage assembly of FIG. 8A, with the engagement feature of the support mechanism engaging the coupling assembly to fully retract the engagement feature.
Figure 10B:
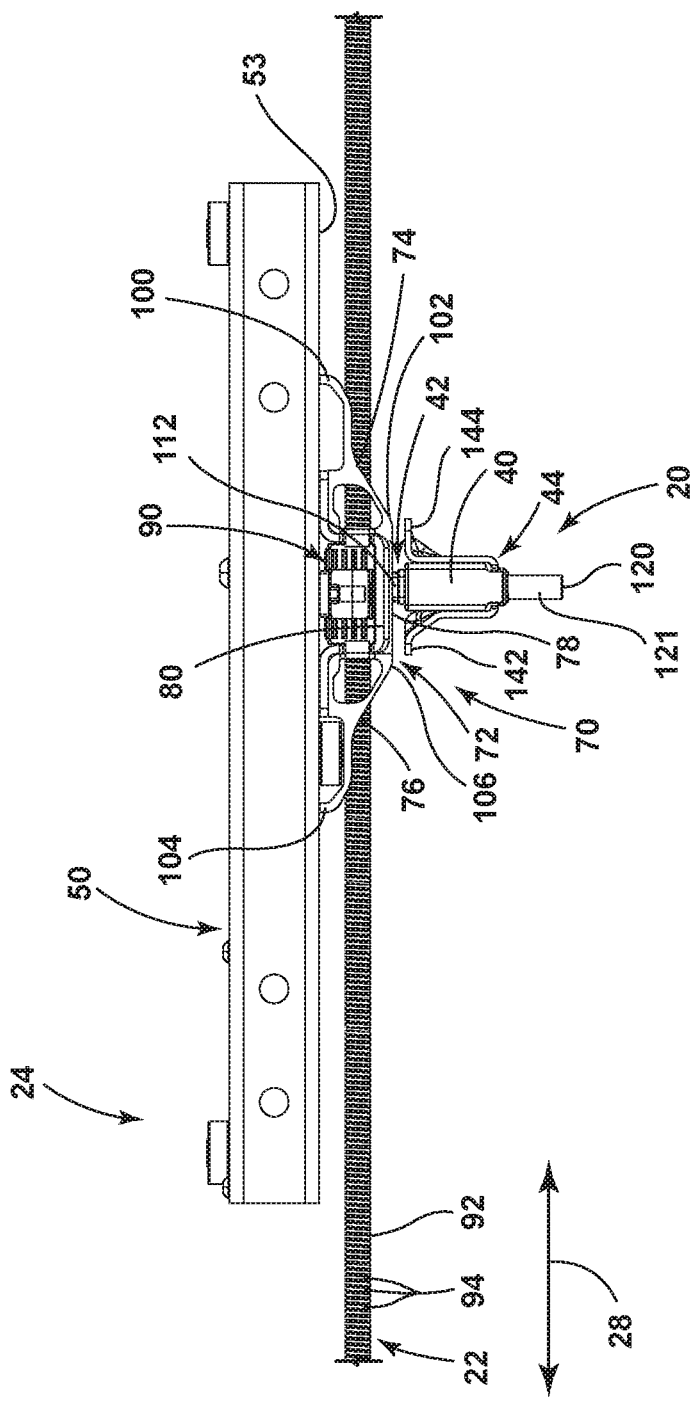
FIG. 10B is a top plan view of the support mechanism and carriage assembly of FIG. 10A.

Referring now to FIGS. 10A and 10B, the first carriage assembly 24 has further moved from left to right relative to FIGS. 8A-9B, such that the support mechanism 20 is now aligned with the intermediate portion 78 of the slider bracket 72. In this way, the engagement feature 42 has moved from having the first and second engagement members 112, 114 disposed on the first side of the elongate shaft 22, to the first and second engagement members 112, 114 being moved to the second and opposite side of the elongate shaft 22 having been urged by the first ramp portion 74 from the first end 100 to the second end 102 thereof. Thus, in FIGS. 10A, 10B, the engagement feature 42 is in a fully retracted position, with the first and second engagement members 112, 114 partially retracted into the interior portion 130 of the housing 40 and the stem portion 120 is shown in a fully extended position through the receiving aperture 152 of the support bracket 44. With the engagement feature 42 in the fully retracted position, it is contemplated that the biasing mechanism 46 (FIG. 3) has been loaded and is configured to bias the engagement feature 42 towards the deployed position. Specifically, it is contemplated that within the interior portion 130 of the housing 40, the abutment wall 118 of the engagement feature 42 will act against the first end 124 of the biasing mechanism 46 to contract the biasing mechanism 46 while the second end 126 thereof abuts the rear wall 140 of the support bracket 44 as the engagement feature 42 retracts. It is further contemplated that the second end 126 of the biasing mechanism 46 could abut a feature of the housing 40 as the engagement feature 42 retracts. Further, with the engagement feature 42 in the retracted position, the first and second engagement members 112, 114 are also in the retracted position, so as to be disengaged from the elongate shaft 22. As the first carriage assembly 24 moves along the elongate shaft 22, it is contemplated that the first and second engagement members 112, 114 ride along the intermediate portion of the slider bracket 72 until they reach the second ramp portion 76 of the slider bracket 72, wherein the first and second engagement members 112, 114 begin their approach to the elongate shaft 22 for engagement therewith. Thus, in FIGS. 10A and 10B, the elongate shaft 22 is spaced-apart from, or disengaged from, the receiving area 116 when the first and second engagement members 112, 114 are in the retracted position.

Figure 11A:
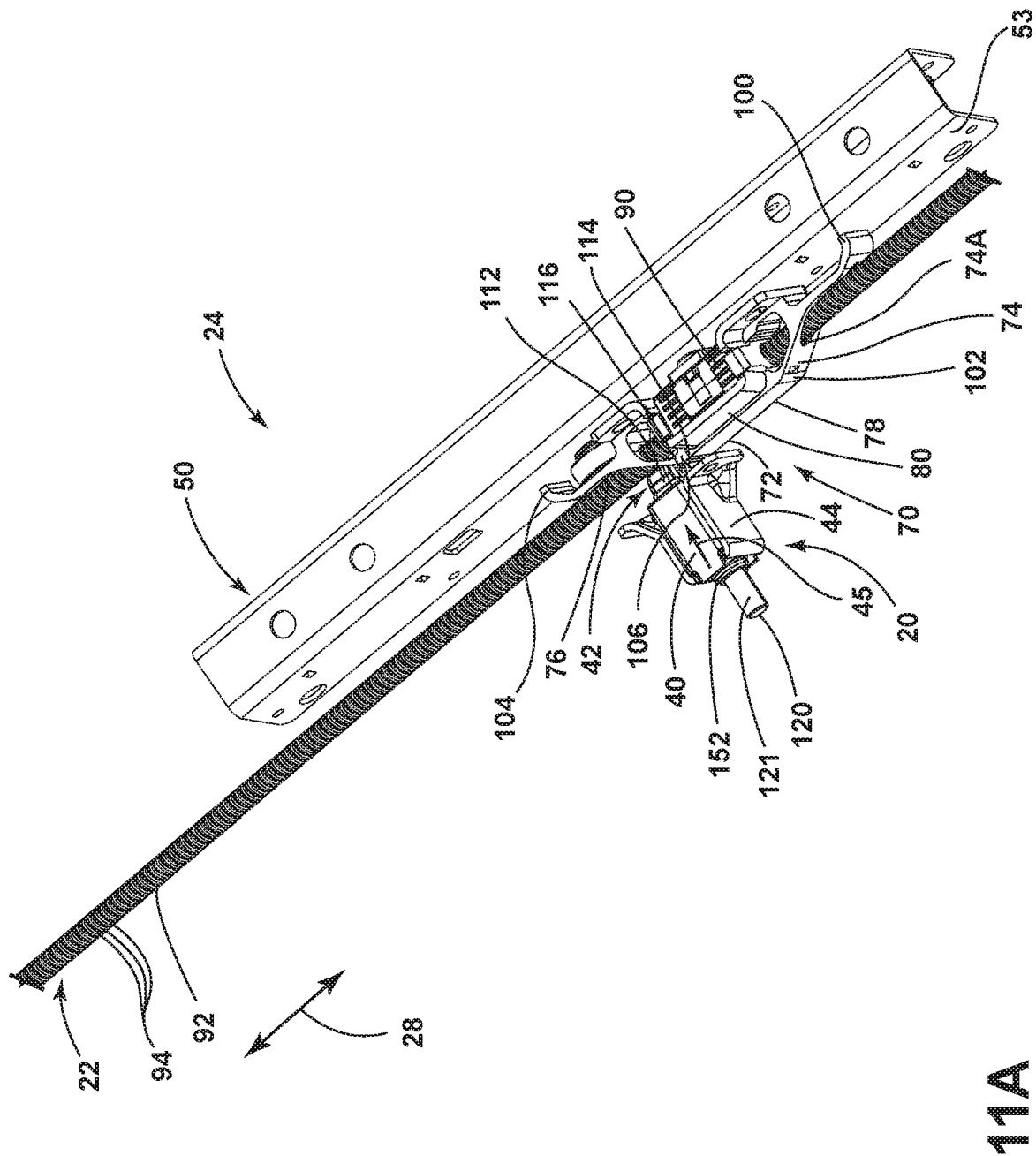
FIG. 11A is a top perspective view of the support mechanism and carriage assembly of FIG. 8A, with the engagement feature of the support mechanism engaging the coupling assembly to partially retract the engagement feature.
Figure 11B:
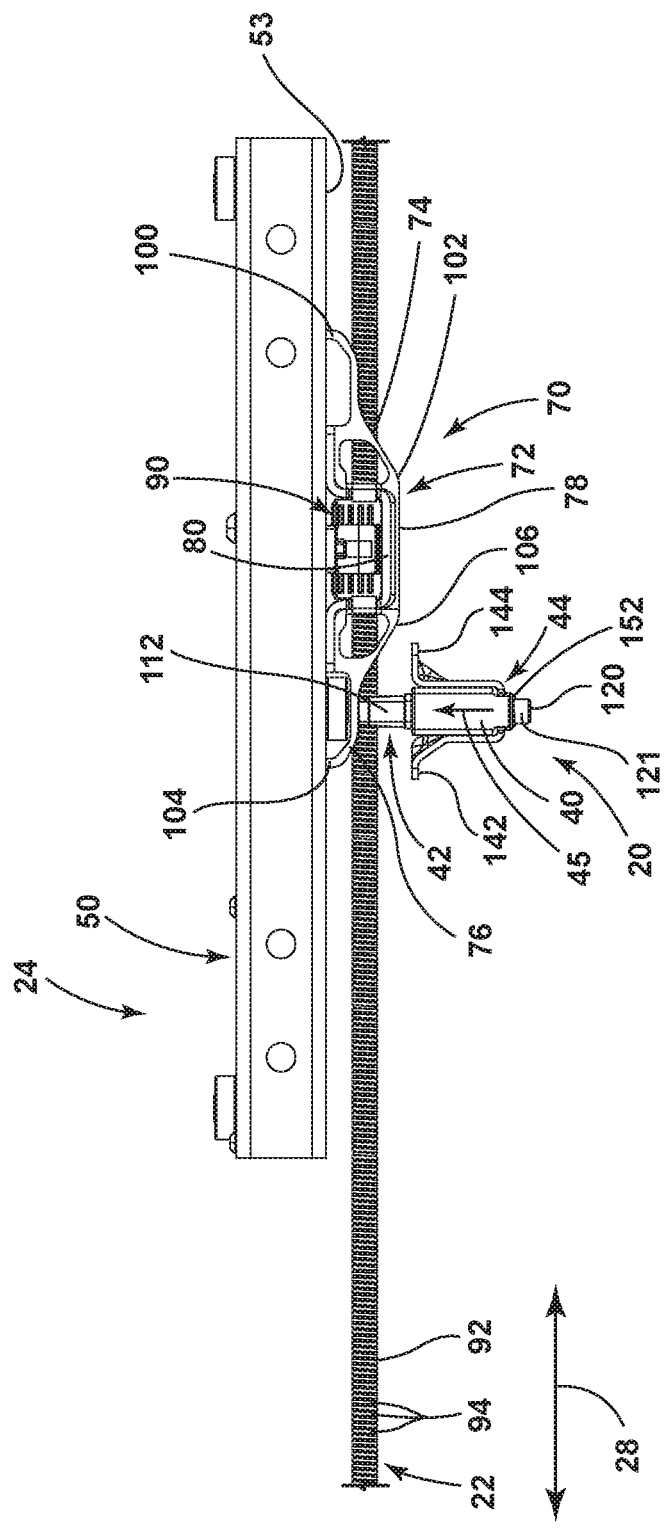
FIG. 11B is a top plan view of the support mechanism and carriage assembly of FIG. 11A with the engagement feature partially engaged with the elongate shaft.

Referring now to FIG. 11A, the first carriage assembly 24 has further moved from the left to the right along the elongate shaft 22 relative to FIGS. 8A-10B. As such, the engagement feature 42 of the support mechanism 20 has reached and passed a second end 106 of the second ramp portion 76. As shown in FIGS. 11A and 11B, the second ramp portion 76 of the slider bracket 72 includes a first end 104 and a second end 106. The first end 104 is shown disposed on the first side of the elongate shaft 22 similar to the first end 100 of the first ramp portion 74. The second end 106 of the second ramp portion 76 is shown disposed on the second side of the elongate shaft 22, similar to the second end 102 of the first ramp portion 74. Thus, the second ramp portion 76 acts as a re-introductory ramp for the engagement feature 42 of the support mechanism 20 to reintroduce the engagement feature 42 to engagement with the elongate shaft 22. Thus, as the first carriage assembly 24 moves further along the elongate shaft 22 in a left to right direction, the first and second engagement member 112, 114 will move towards the deployed position, as biased by the biasing mechanism 46 thereof, to reengage the elongate shaft 22. Referring now to FIG. 11B, the engagement feature 42 is shown partially engaged with the elongate shaft 22. Thus, as the engagement feature 42 moves to the deployed position along the path as indicated by arrow 45, the engagement feature 42 stays in contact with the angled surface of the second ramp portion 76 as the first carriage assembly 24 moves from left to right along the elongate shaft 22.

Figure 12A:
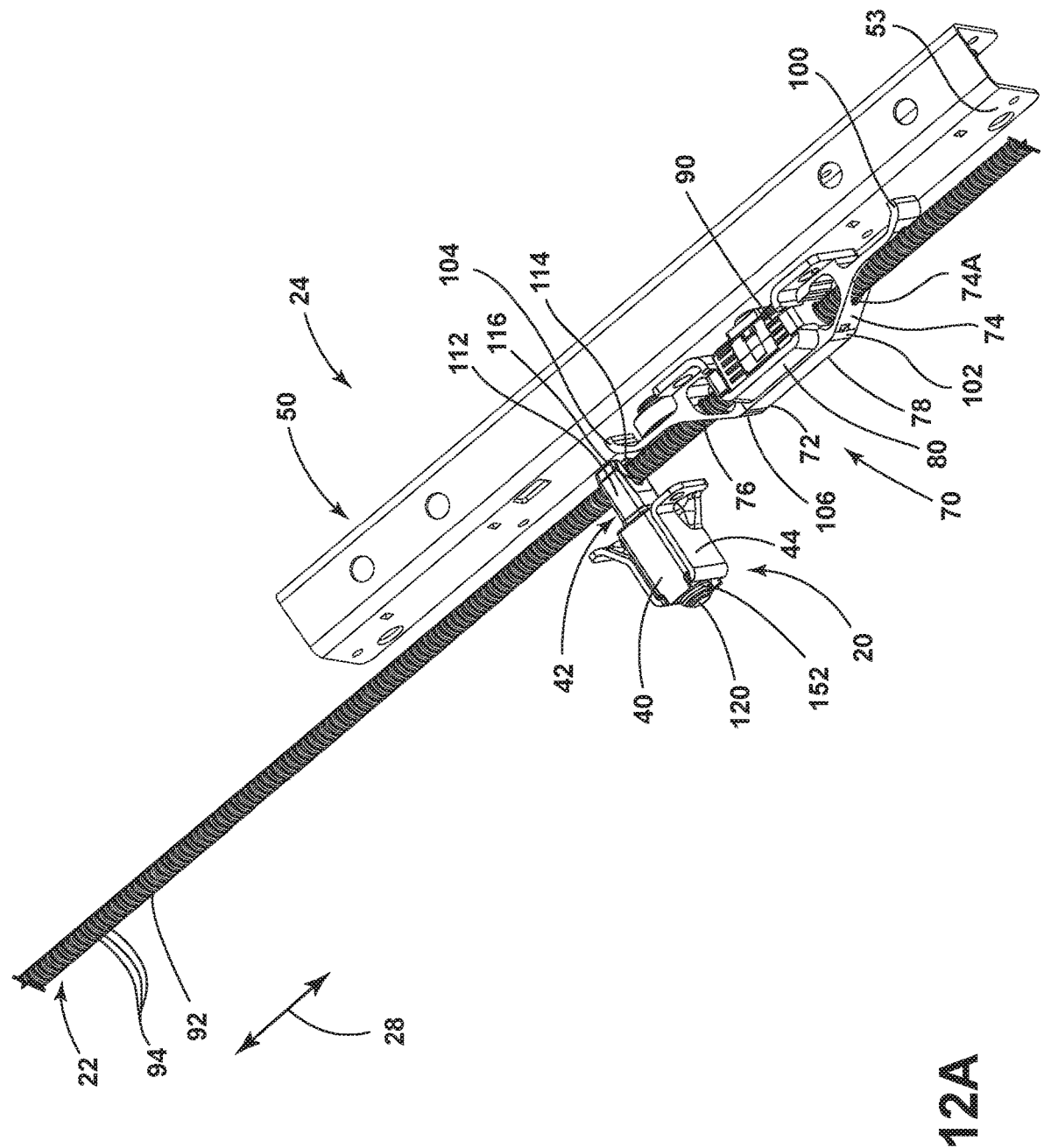
FIG. 12A is a top perspective view of the support mechanism and carriage assembly of FIG. 8A, with the engagement feature of the support mechanism in the deployed position to reengage the shaft.
Figure 12B:
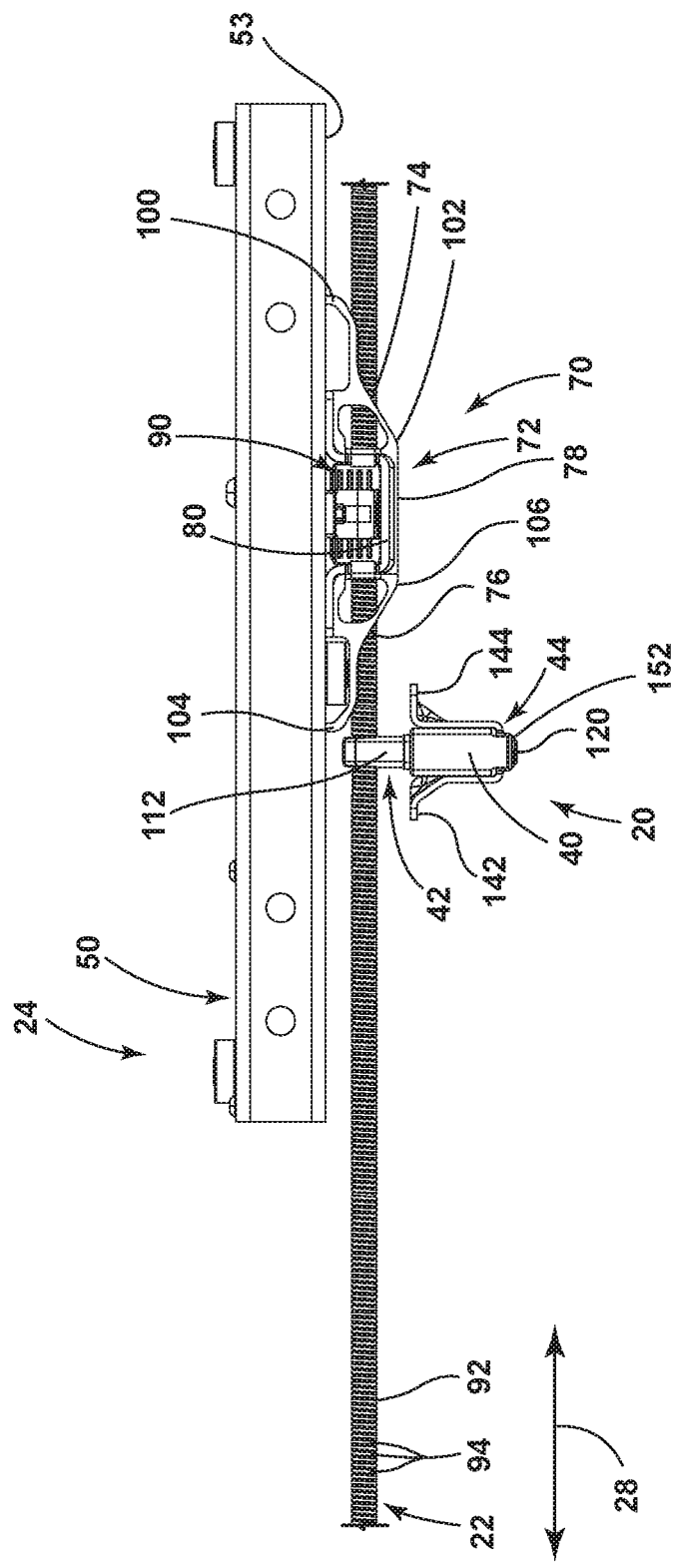
FIG. 12B is a top plan view of the support mechanism and carriage assembly of FIG. 11A.

Referring now to FIGS. 12A and 12B, the first carriage assembly 24 is shown having moved past the support mechanism 20 along the elongate shaft 22, such that the first and second engagement members 112, 114 are fully engaged with the elongate shaft 22. With the engagement feature 42 in the fully deployed position, the elongate shaft 22 is again received in the receiving area 116. In this way, the support mechanism provides an engagement feature 42 that is selectively engaged with the elongate shaft 22 to support the elongate shaft 22 in positions both above and below the elongate shaft 22 via the first and second engagement members 112, 114. Should the first carriage assembly 24 now move from the right to left direction along the elongate shaft 22, the second ramp portion 76 will act as the first introductory ramp of the slider bracket 72 to move the engagement feature 42 from the deployed position to the retracted position. Thus, the first and second ramp portions 74, 76 contact and guide the first and second engagement members 112, 114 from the deployed position to the retracted position, as well as from the retracted position to the deployed position as the carriage assembly 24 is driven past the support mechanism 20 along the elongate shaft 22. In this way, the support mechanisms 20 of the present concept provide selective support for the elongate shaft 22 as the carriage assemblies 24, 26 move along the elongate shaft 22. It is contemplated that the support mechanisms 20 are spaced apart along the elongate shaft 22, such that the elongate shaft 22 is consistently supported by a number of the support mechanisms that are not immediately aligned with a coupling assembly 70 of a carriage assembly, such as carriage assemblies 24, 26.

Referring now to FIG. 13A, the elongate shaft 22 includes upper and lower notches 160, 162 which include flat outer surfaces 161, 163, respectively. The notches 160, 162 are inset from an outer perimeter of the threaded cylindrical body portion 92 of the elongate shaft 22. The upper and lower notches 160, 162 are configured to receive the first and second engagement members 112, 114, as shown in FIG. 13B. With the first and second engagement members 112, 114 disposed on opposite sides of the elongate shaft 22 within the notches 160, 162, the elongate shaft 22 is supported on both upper and lower sides of the elongate shaft 22. While the elongate shaft 22 is a threaded member, the elongate shaft 22 does not rotate, but rather, is a stationary member upon which the carriage assemblies, such as carriage assemblies 24, 26, move along in a threaded engagement. Thus, the notches 160, 162 provide an inset feature along the threaded cylindrical body portion 92 of the elongate shaft 22 to support the same within the interior portion 6 of the track member 4.

As further shown in FIG. 13B, the front opening 132 of the housing 40 includes a collar 132A which is contemplated to be received through an associated access aperture 30A-30D (FIG. 2) disposed through the track member 4. In this way, it is contemplated that the outer surface of front retaining wall 135 will contact the outer surface 12A of the track member 4 when the support mechanism 20 is coupled thereto. Thus, as shown in FIG. 13B, the first and second engagement members are received in the upper and lower notches 160, 162 of the elongate shaft 22 when the first and second engagement members 112, 114 are in the deployed position.

According to one aspect of the present invention, a track system includes a track member with an elongate shaft mounted thereto. At least one support mechanism is mounted to the track member. The at least one support mechanism includes a housing. An engagement feature includes first and second engagement members spaced-apart from one another to define a receiving area therebetween. The first and second engagement members are operable between deployed and retracted positions relative to the housing. The elongate shaft is received in the receiving area when the first and second engagement members are in the deployed position.

Embodiments of the first aspect of the invention can include any one or a combination of the following features:
  the at least one support mechanism includes a support bracket operably coupled to the housing and the track member;
  the support bracket includes a rear wall having a receiving aperture disposed therethrough;
  the engagement feature includes a stem portion from which the first and second engagement members outwardly extend;
  the at least one support mechanism includes a biasing mechanism operably coupled between the stem portion and one of the housing and the support bracket, wherein the biasing mechanism biases the first and second engagement members towards the deployed position;
  the stem portion is slideably received through the receiving aperture between extended and retracted positions;
  the elongate shaft includes a threaded cylindrical body portion;
  the elongate shaft includes upper and lower notches disposed on opposite sides of the threaded cylindrical body portion;
  the first and second engagement members are received in the upper and lower notches, respectively, of the elongate shaft when the first and second engagement members are in the deployed position;
  a carriage assembly operably coupled to the elongate shaft for movement therealong by a coupling assembly, wherein the coupling assembly includes a slider bracket having first and second ramp portions disposed on opposite sides thereof, wherein the first and second ramp portions contact and guide the first and second engagement members from the deployed position to the retracted position and from the retracted position to the deployed position as the carriage assembly is driven past the at least one support mechanism along the elongate shaft;
  the first and second ramp portions include receiving apertures disposed therethrough, and further wherein the elongate shaft is received through the receiving apertures of the first and second ramp portions;
  the coupling assembly further includes a gear box gearingly engaged with the threaded cylindrical body portion of the elongate shaft; and
  the coupling assembly further includes a mounting bracket disposed around the gear box and operably coupled to the slider bracket, wherein the mounting bracket mounts the coupling assembly to the carriage assembly.

According to another aspect of the present invention, a support mechanism includes a housing having an interior portion. An engagement feature includes upper and lower engagement members vertically spaced-apart from one another to define a receiving area therebetween. The engagement feature is operable between deployed and retracted positions relative to the housing. The upper and lower engagement members extend outwardly from the interior portion of the housing when the engagement feature is in the deployed position. The upper and lower engagement members are at least partially received within the interior portion of the housing when the engagement feature is in the retracted position. A biasing mechanism is operably coupled to the engagement feature to bias the engagement feature towards the deployed position.

Embodiments of the second aspect of the invention can include any one or a combination of the following features:
  a support bracket coupled to the housing and covering a rear opening of the housing, wherein the support bracket includes a receiving aperture disposed therethrough; and
  the engagement feature includes a stem portion from which the first and second engagement members outwardly extend, and further wherein the stem portion is slideably received through the receiving aperture of the support bracket.

According to yet another aspect of the present invention, a track system includes a track member having an interior portion and an exterior portion. An elongate shaft is mounted within the interior portion of the track member. At least one support mechanism is mounted to the exterior portion of the track member. The at least one support mechanism includes a housing. An engagement feature includes first and second engagement members spaced-apart from one another to define a receiving area therebetween. The first and second engagement members are operable between deployed and retracted positions. The elongate shaft is supported in the receiving area by the first and second engagement members when the first and second engagement members are in the deployed position. The elongate shaft is spaced-apart from the receiving area when the first and second engagement members are in the retracted position. A carriage assembly is operably coupled to the elongate shaft for movement therealong by a coupling assembly. The coupling assembly includes a slider bracket having at least one ramp portion configured to contact and guide the first and second engagement members from the deployed position to the retracted position as the carriage assembly is driven past the at least one support mechanism along the elongate shaft.

Embodiments of the third aspect of the invention can include any one or a combination of the following features:
  the elongate shaft includes a threaded cylindrical body portion;
  the elongate shaft includes first and second notches disposed on opposite sides of the threaded cylindrical body portion; and
  the first and second engagement members are received in the first and second notches, respectively, of the elongate shaft when the first and second engagement members are in the deployed position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A track system, comprising:
a track member;
an elongate shaft mounted to the track member, wherein the elongate shaft includes a threaded cylindrical body portion having a first set of upper and lower notches disposed on opposite sides of the threaded cylindrical body portion, and a second set of upper and lower notches spaced-apart from the first set of upper and lower notches and disposed on opposite sides of the threaded cylindrical body portion;
first and second support mechanisms spaced-apart from one another and mounted to the track member, the first and second support mechanisms each comprising:
a housing; and
an engagement feature having first and second engagement members spaced-apart from one another to define a receiving area therebetween, wherein the first and second engagement members are moveable between deployed and retracted positions relative to the housing, such that the first and second engagement members extend outwardly from an interior portion of the housing when the engagement feature is in the deployed position, and further wherein the elongate shaft is received in the receiving area when the first and second engagement members are in the deployed position.

2. The track system of claim 1, wherein the first and second support mechanisms each include a support bracket operably coupled to the housing and the track member.

3. The track system of claim 2, wherein the support bracket includes a rear wall having a receiving aperture disposed therethrough.

4. The track system of claim 3, wherein the engagement features of the first and second support brackets each include a stem portion from which the first and second engagement members outwardly extend.

5. The track system of claim 4, wherein each of the first and second support mechanisms include a biasing mechanism operably coupled between the stem portion and one of the housing and the first or second support bracket, wherein the biasing mechanism biases the first and second engagement members towards the deployed position.

6. The track system of claim 5, wherein the stem portion is slideably received through the receiving aperture between extended and retracted positions.

7. The track system of claim 1, wherein the first and second engagement members of the first support mechanism are received in the first set of upper and lower notches, respectively, of the elongate shaft when the first and second engagement members of the first support mechanism are in the deployed position, and further wherein the first and second engagement members of the second support mechanism are received in the second set of upper and lower notches, respectively, of the elongate shaft when the first and second engagement members of the second support mechanism are in the deployed position.

8. The track system of claim 1, including:
a carriage assembly operably coupled to the elongate shaft for movement therealong by a coupling assembly, wherein the coupling assembly includes a slider bracket having first and second ramp portions disposed on opposite sides thereof, wherein the first and second ramp portions contact and guide the first and second engagement members from the deployed position to the retracted position and from the retracted position to the deployed position as the carriage assembly is driven past the at least one support mechanism along the elongate shaft.

9. The track system of claim 8, wherein the first and second ramp portions include receiving apertures disposed therethrough, and further wherein the elongate shaft is received through the receiving apertures of the first and second ramp portions.

10. The track system of claim 9, wherein the coupling assembly further includes a gear box gearingly engaged with the threaded cylindrical body portion of the elongate shaft.

11. The track system of claim 10, wherein the coupling assembly further includes a mounting bracket disposed around the gear box and operably coupled to the slider bracket, wherein the mounting bracket mounts the coupling assembly to the carriage assembly.

12. A track system, comprising:
a track member having an interior portion and an exterior portion;
an elongate shaft mounted within the interior portion of the track member;
at least one support mechanism mounted to the exterior portion of the track member, the at least one support mechanism comprising:
a housing;
an engagement feature having first and second engagement members spaced-apart from one another to define a receiving area therebetween, wherein the first and second engagement members are operable between deployed and retracted positions, and further wherein the elongate shaft is supported in the receiving area by the first and second engagement members when the first and second engagement members are in the deployed position, and further wherein the elongate shaft is spaced-apart from the receiving area when the first and second engagement members are in the retracted position; and
a carriage assembly operably coupled to the elongate shaft for movement therealong by a coupling assembly, wherein the coupling assembly includes a slider bracket having at least one ramp portion configured to contact and guide the first and second engagement members from the deployed position to the retracted position as the carriage assembly is driven past the at least one support mechanism along the elongate shaft, and further wherein the at least one ramp portion includes a receiving aperture disposed therethrough, and further wherein the elongate shaft is received through the receiving aperture of the at least one ramp portion.

13. The track system of claim 12, wherein the elongate shaft includes a threaded cylindrical body portion.

14. The track system of claim 13, wherein the elongate shaft includes first and second notches disposed on opposite sides of the threaded cylindrical body portion.

15. The track system of claim 14, wherein the first and second engagement members are received in the first and second notches, respectively, of the elongate shaft when the first and second engagement members are in the deployed position.

\* \* \* \* \*